(12) United States Patent
McGrath et al.

(10) Patent No.: US 9,315,111 B1
(45) Date of Patent: Apr. 19, 2016

(54) DETERMINING VEHICLE POSITION USING RFID

(71) Applicant: Proterra Inc., Greenville, SC (US)

(72) Inventors: Seamus T. McGrath, Simpsonville, SC (US); Keyur M. Shah, Greenville, SC (US)

(73) Assignee: Proterra Inc., Greenville, SC (US)

( * ) Notice: Subject to any disclaimer, the term of this patent is extended or adjusted under 35 U.S.C. 154(b) by 0 days.

(21) Appl. No.: 14/755,738

(22) Filed: Jun. 30, 2015

(51) Int. Cl.
*H02J 7/00* (2006.01)
*B60L 11/18* (2006.01)

(52) U.S. Cl.
CPC ......... *B60L 11/1833* (2013.01); *B60L 11/1816* (2013.01)

(58) Field of Classification Search
CPC .............................. H02J 7/0027; Y02T 90/125
USPC .......................................... 320/104, 106, 109
See application file for complete search history.

(56) References Cited

U.S. PATENT DOCUMENTS

| 2006/0180371 | A1* | 8/2006 | Breed | G07C 5/008 180/197 |
| 2012/0280656 | A1* | 11/2012 | Bedell | B60L 3/0069 320/109 |
| 2014/0132210 | A1 | 5/2014 | Partovi | |
| 2014/0217966 | A1* | 8/2014 | Schneider | B60L 11/182 320/108 |

FOREIGN PATENT DOCUMENTS

WO      WO2010134763 A2    11/2010

* cited by examiner

*Primary Examiner* — Edward Tso
*Assistant Examiner* — Aaron Piggush
(74) *Attorney, Agent, or Firm* — Bookoff McAndrews, PLLC

(57) ABSTRACT

A method of charging an electric vehicle at a charging station may include driving the vehicle towards the charging station, and using a plurality of RFID tags and one or more RFID readers to determine a relative position of the charging interface of the vehicle with respect to the charge head assembly of the charging station. The method may also include engaging the charge head assembly with the charging head, and charging the vehicle.

20 Claims, 4 Drawing Sheets

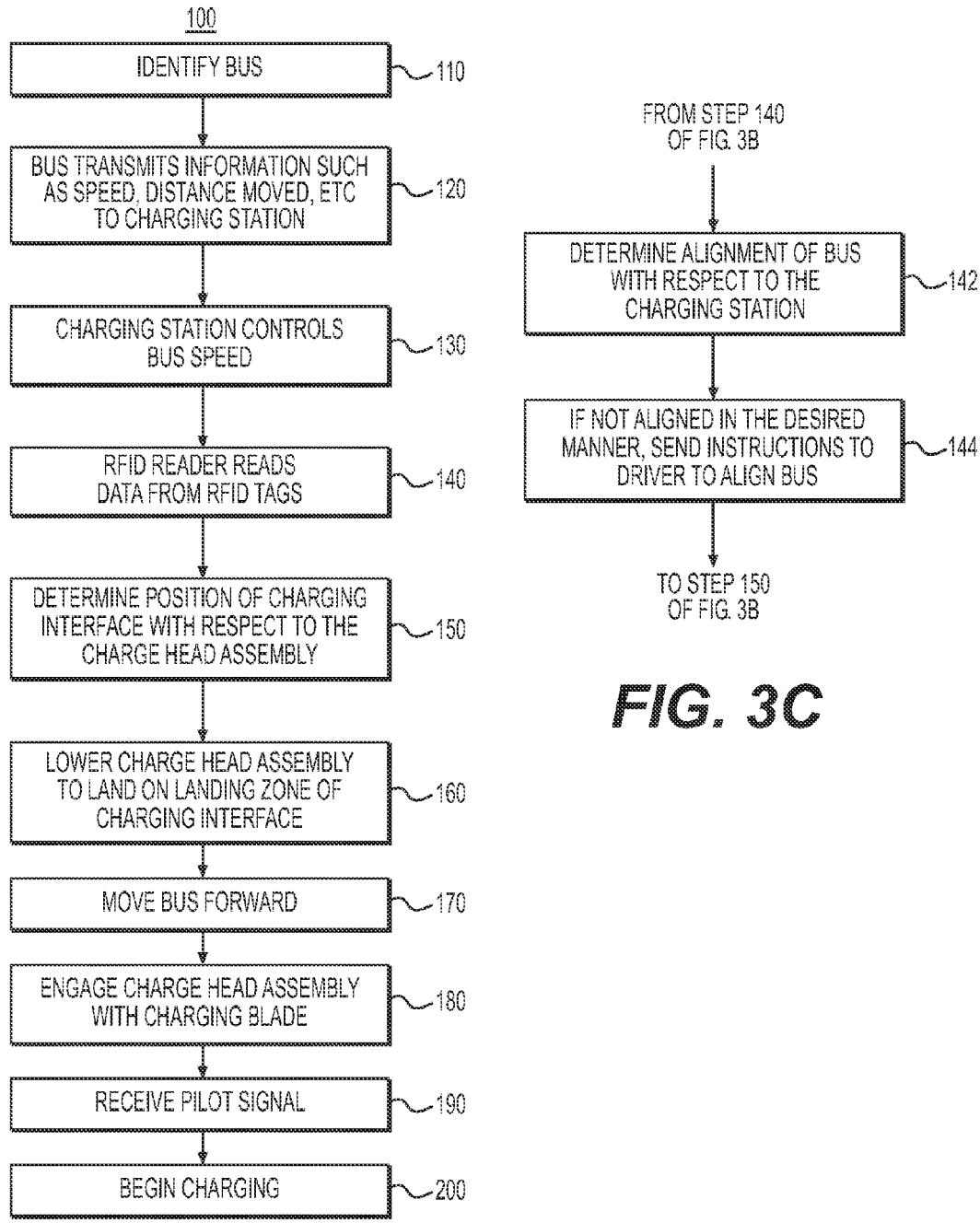

DETERMINING VEHICLE POSITION USING RFID

TECHNICAL FIELD

The current disclosure relates to systems and methods for determining the position of a vehicle using Radio Frequency Identification (RFID).

BACKGROUND

Electric vehicles, such as transit buses, are charged at a charging station. When a bus is positioned proximate a charging station, a charging arm of the charging station automatically engages with a charging interface of the bus to charge the bus. For proper engagement of the charging arm and the charging interface, the bus should be correctly positioned at the charging station. In some applications, the driver of the bus manually aligns and positions the bus at the charging station by sight. Improper alignment or positioning of the bus at the charging station will cause misalignment of the charging interface with respect to the charging arm and cause a delay in charging.

Embodiments of the current disclosure may alleviate the problems discussed above and/or other problems in the art. The scope of the current disclosure, however, is defined by the attached claims, and not by the ability to solve any specific problem.

SUMMARY

Embodiments of the present disclosure relate to systems and methods for aligning and/or positioning a vehicle using RFID. Each of the embodiments disclosed herein may include one or more of the features described in connection with any of the other disclosed embodiments.

In one embodiment, a method of charging an electric vehicle at a charging station is disclosed. The electric vehicle may include a charging interface configured to engage with a charge head assembly of the charging station. The method may include driving the vehicle towards the charging station, and using a plurality of RFID tags and one or more RFID readers to determine a relative position of the charging interface of the vehicle with respect to the charge head assembly of the charging station. The method may also include engaging the charge head assembly with the charging head, and charging the vehicle.

In another embodiment, a method of charging an electric vehicle using an overhanging charge head assembly is disclosed. The method includes determining a position of a charging interface of the vehicle with respect to the charge head assembly using a plurality of RFID tags and one or more RFID readers. The method may also include lowering the charge head assembly towards a roof of the vehicle, and moving the vehicle forward to engage the charge head assembly with the charging interface. The method may further include charging the vehicle through the charge head assembly.

In yet another embodiment, a charging station for an electric vehicle is disclosed. The charging station may include a charging head assembly overhanging a road surface. The charging head assembly may be configured to engage with, and form an electrical connection with, a charging interface on a roof of the electric vehicle. The charging station may also include a plurality of a RFID tags arranged on the road surface. The plurality of RFID tags may be associated with one or more RFID readers positioned on the vehicle. The plurality of RFID tags and the one or more RFID readers may be together configured to determine a relative position of the charging interface with respect to the charge head assembly.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

FIG. 3B illustrates an exemplary method of charging the bus of FIG. 1 at the charging station of FIG. 2;

FIG. 3C illustrates an exemplary method of aligning the bus of FIG. 1 for charging at the charging station of FIG. 2;

DETAILED DESCRIPTION

The present disclosure describes systems and methods for aligning and/or positioning a vehicle using RFID. While principles of the current disclosure are described with reference to aligning/positioning an electric bus at a bus stop, it should be understood that the disclosure is not limited thereto. Rather, the systems and methods of the present disclosure may be used to align or position any vehicle (motorcycle, trains, cars, plane, etc.).

Figure 1:
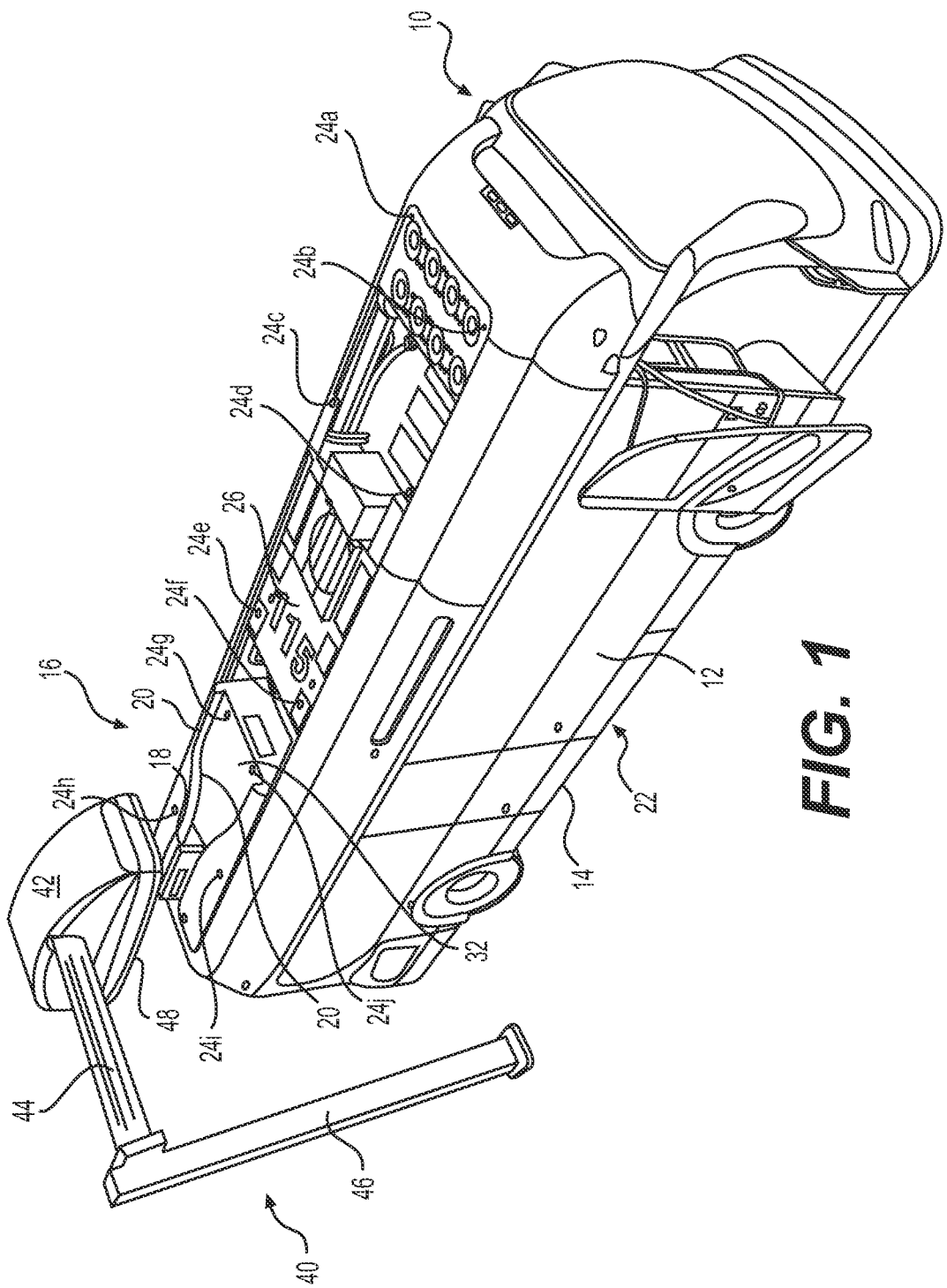
FIG. 1 illustrates an exemplary electric bus of the current disclosure.

FIG. 1 illustrates an electric vehicle in the form of an electric transit bus 10. Electric bus 10 may include a body 12 enclosing a space for passengers. In some embodiments, some (or all) parts of body 12 may be fabricated using composite materials to reduce the weight of bus 10. Without limitation, body 12 of bus 10 may have any size, shape, and configuration. In some embodiments, bus 10 may be a low-floor electric bus. As is known in the art, in a low-floor bus, there are no steps at the front and/or the back doors of the bus. In such a bus, the floor 14 of the bus 10 is positioned close to the road surface to ease entry and exit into the bus 10. In some embodiments, the floor height of the low-floor bus may be about 12-16 inches (30.5-40.6 cm) from the road surface. In this disclosure, the term "about" is used to indicate a possible variation of ±10% in a stated numeric value.

Bus 10 may be propelled by an electric motor. Batteries 22 may store electrical energy to power the motor. In some embodiments, these batteries 22 may be positioned under the floor 14 of the bus 10, and may be configured as a plurality of battery packs. These battery packs may be positioned in cavities (not shown) located under the floor of the bus 10, and may be accessible from below the bus 10. The batteries 22 may have any chemistry and construction. In some embodiments, the batteries 22 may be lithium titanate batteries. In some embodiments, the layout and design of the batteries 22 may enable fast charging of the batteries 22. By fast charging, batteries 22 may be recharged (to greater than about 95% state of charge) in less than or equal to about 10 minutes.

A charging interface 16 may be provided on the roof 26 of the bus 10 (or elsewhere) to charge the batteries 22. The charging interface 16 may include components that interface with a charge head assembly 42 of an external charging station 40 to charge the batteries 22. These components may include a charging blade 18 and a funnel-shaped alignment scoop 20. To charge the bus, when bus 10 is positioned under the charge head assembly 42 of charging station 40, the charge head assembly 42 may descend to land on a landing zone 32 of the charging interface 16. With the charge head assembly 42 on the landing zone 32, the bus 10 is moved forward to engage the electrodes (not shown) of the charge head assembly 42 with the charging blade 18. As the bus moves forward, the funnel-shaped configuration of the alignment scoop 20 may align and direct the charge head assembly 42 towards the charging blade 18. The funnel shape of the alignment scoop 20 enables the charging system to tolerate some amount of lateral misalignment between the charge head assembly 42 and the charging interface 16.

Electric bus 10 may be a transit bus that operates along a fixed route in a geographic area (city, town, airport, campus, etc.). Bus 10 may continuously travel on the route picking up and dropping off passengers at several bus stops along the route. One or more charging stations 40 may be located on the route to charge the buses 10. Some of these charging stations 40 may be located at bus stops. A bus 10 may be recharged while passengers embark and disembark at the bus stop.

Figure 2:
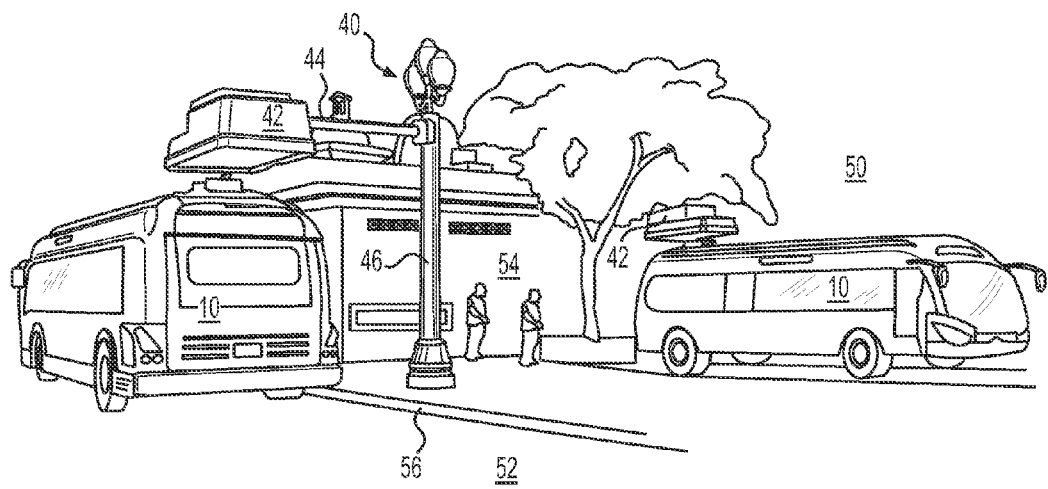
FIG. 2 illustrates a bus stop with an exemplary charging station.

FIG. 2 illustrates an exemplary bus stop 50 having a plurality of charging stations 40. The charge head assembly 42 of each charging station 40 may overhang a road surface 52. In some embodiments, as illustrated in FIG. 2, the charge head assembly 42 may be connected to a cantilever arm 44 that is connected to a post 46 fixed to the ground. However, other configurations are also possible. For example, in some embodiments, the cantilever arm 44 may extend sideways from the side of a building 54, or the charge head assembly 42 may extend downwards from a roof that extends over the road surface 52. The charging station 40 may be coupled to an electric grid that is supplied with energy (electricity) by a utility company. Single phase or three-phase AC current from the electrical grid may be converted into DC current and directed into the charge head assembly 42. The charging station 40 may include electrical components (e.g., rectifier, power converter, switches, safety mechanisms, etc.) to convert AC current from grid to DC current for the charge head assembly 42. In some embodiments, these components may be housed in a console or a structure (e.g., building 52) of bus stop 50.

As explained previously, during charging, the bus 10 is positioned under the charge head assembly 42 and the charge head assembly 42 is lowered to make electrical contact with the charging interface 16. Although the alignment scoop 20 enables the system to tolerate some amount of lateral misalignment, if the bus 10 is not at least roughly aligned with respect to the charging station 40, the charge head assembly 42 may not properly engage with the charging blade 18 of charging interface 16. In some embodiments, positioning the bus 10 substantially parallel to, and at a distance of about 0.5-5 feet from, a curb 56 of the bus stop 50 may properly align the bus 10 with respect to the charging station 40.

With the bus 10 thus aligned, the charge head assembly 42 descends and lands on the landing zone 32 of the charging interface 16. The bus 10 may be moving or may be stationary when the charge head assembly 42 lands on the landing zone 32. With the charge head assembly 42 on the landing zone 32, further movement of the bus 10 in a forward direction engages the charge head assembly 42 with the charging blade 18. As can be seen in FIG. 1, bus 10 includes several components on its roof 26 (e.g., HVAC unit, radiator, etc.). If the charge head assembly 42 descends and lands at a location other than the landing zone 32, it may collide with one of these components and cause damage. Therefore, in addition to being properly aligned with respect to the charging station 40, the bus 10 should also be positioned such that the charge head assembly 42 lands on the landing zone 32 when it descends. To assist in the proper alignment and/or positioning of bus 10 with respect to the charging station 40, bus 10 and/or charging station 40 may include sensors or other mechanisms. In some embodiments, these sensors may include RFID tags and RFID readers.

With reference to FIG. 1, bus 10 may include a plurality of RFID tags 24a, 24b, 24c, 24d, 24e, 24f, 24g, 24h, 24i (collectively or individually referred to as 24) positioned thereon. In general, these RFID tags 24 (or tags 24) may be positioned anywhere on bus 10, and these tags 24 may be arranged in any pattern (e.g., see arrangement of tags 24 in a grid-like pattern in FIG. 3A). Tags 24 may include microchips with unique information (e.g., id number, positional information, etc.) stored in each tag 24. One or more RFID readers 48 (e.g., reader 48 in FIG. 1 and readers 48a and 48b of FIG. 3A) may be configured to read the information stored in the tags 24. The reader 48 is a device that has one or more antennas that emit radio waves. The reader 48 may be positioned at any location from which its emitted radio waves reach the tags 24. When a tag 24 (associated with a reader 48) receives the emitted signals from reader 48, the tag 24 transmits its stored information back to the reader 48. The reader 48 is configured to receive the transmission from the tags 24. Based on the data received from the multiple tags 24 (and/or the relative strength of the signals), the reader 48 may determine the location of each tag 24 with respect to the reader 48 (e.g., by triangulation).

In some embodiments, as illustrated in FIG. 1, the tags 24 may be positioned on the roof 26 of bus 10, and the reader 48 may be positioned on the charging station 40 (e.g., on charge head assembly 42). Any number of tags 24 may be positioned on the roof 26. Although FIG. 1 illustrates ten tags positioned on the roof 26, this is only exemplary. In some embodiments, an array of tags 24 may be positioned in a grid-like pattern on the roof 26 (see FIG. 3A). As the bus 10 passes under the charge head assembly 42, the reader 48 receives the transmitted signals from the multiple tags 24 on roof 26. Based on these signals, the reader 48 (or a control system operatively coupled to the reader 48) determines the alignment of the bus 10 and the relative position of the charging interface 16 with respect to the charge head assembly 42. In some embodiments, the charging station 40 may include multiple readers 48 (see FIG. 3A). In some embodiments, these multiple readers 48 may be positioned on the charge head assembly 42. Having multiple readers and/or tags may improve the accuracy of the alignment and the location determination, by providing redundancy.

The tags 24 may be attached to the roof 26 by any means. In some embodiments, the tags 24 may be attached to the roof 26 using an adhesive. In some embodiments, the tags 24 may be embedded in the roof 26. Similarly, reader 48 may be attached to, or embedded on, the charging station 40. As is known in the art, reader 48 may have an antenna coupled or incorporated thereon. The readers, antennas, and tags may be of any type (linear polarized, circular polarized, etc.). In general, the reader 48 and its antenna may be selected based on the type and location of the tags 24. For instance, if in an application, a plurality of similar tags 24 are attached on the same plane (e.g., roof 26), a reader 48 with a linearly polarized antenna may be used. If the tags 24 are attached on different planes (e.g., some on roof 26 and some on the side of bus 10), a reader 48 with a circular polarized antenna may be used.

In some embodiments, the tags 24 may be omni-directional (horizontally or vertically polarized) and omni-directional antennas may be used to read these tags. For example, adjacent tags in an array of tags 24 (see FIG. 3A) may have the opposite polarity (horizontal, vertical, etc.) and vertical and horizontally polarized readers 48 may be attached to the charging station 40. In such embodiments, a vertical tag may be read with only a vertically polarized antenna and a horizontal tag may only be read with a horizontally polarized antenna. Such an arrangement may allow for finer precision since multiple tags may be placed close to each other as only similarly polarized (e.g., every other tag in an array) may be read by a reader. In some embodiments, additionally or alternatively, tags and readers of different frequency, generation, etc. may be used. In such embodiments, tags of one generation may only be read with a reader of a similar or same generation. In some embodiments, different types of tags may be aligned in a line and the sequence can repeated.

Figure 3A:
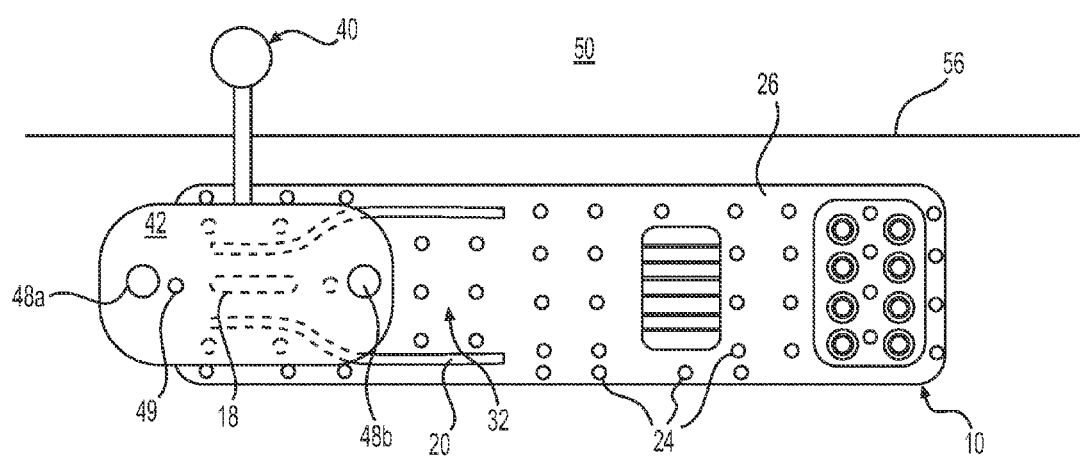
FIG. 3A illustrates a top view of an exemplary bus positioned near the charging station of FIG. 2.

FIG. 3A is a schematic illustration of the top view of a bus 10 positioned under the charge head assembly 42 of a charging station 40 having a plurality of RFID readers 48a, 48b. FIG. 3B illustrates an exemplary method 100 of charging the bus 10 of FIG. 3A. In the description that follows, reference will be made to both FIGS. 3A and 3B. As a bus 10 approaches the charging station 40, the charging station 40 identifies the approaching bus 10 (step 110). To identify the bus 10, an RFID reader (e.g., reader 48a) in the charge head assembly 42 may read the bus-identification information programmed into an RFID tag 24 embedded on the roof 26 of the bus 10. The ID number may be used to confirm that the approaching bus 10 is a bus that is configured to be charged at the charging station 40 (and not a different type of bus that shares bus stop 50). Once the bus ID is confirmed by the charging station 40, the bus 10 may transmit information (e.g., speed, distance moved, etc.) to the charging station 40 (step 120). The charging station 40 may then control the maximum allowable speed of the bus 10 by using speed limit commands (step 130). For example, while the bus 10 is still controlled (steering, acceleration, etc.) by the driver, the maximum allowable speed at which it may approach the charging station 40 may be controlled by the charging station 40. That is, if the driver attempts to approach the charging station 40 at a speed greater than the maximum allowable speed, the charging station 40 may limit the speed of the bus 10.

As the bus 10 moves under the charge head assembly 42, one or both the readers 48a, 48b in the charge head assembly 42 may read the data embedded in the tags 24 (step 140). In the embodiment illustrated in FIG. 3A, the tags 24 are positioned on the roof 26 of bus 10. The embedded data may include information such as tag number, the positional information of each tag 24, etc. Based on this data, the charging station 40 may accurately determine the location of charging interface 16 relative to the charge head assembly 42 (step 150). In some embodiments, data from multiple tags 24 located at known distances from the charging interface 16 may enable the reader 48a, 48b to determine the location of the charging interface 16 by triangulation. In some embodiments, the signal strength from a tag 24 may also assist in the location determination. For instance, the signal may be stronger when a tag 24 is closer to the reader 48. Since methods for determining location based on RFID tags and readers are known in the art, it is not discussed herein. The multiple readers 48a, 48b and tags 24 may also provide redundancy to improve the reliability of the position determination. As explained previously, the tags 24 may include tags of different types (polarity, frequency, generation, etc.), and reader of a similar type may be used to read a tag.

Based on the data from the multiple tags 24, the reader 48 (or a control unit coupled to the reader 48) may identify when the charge head assembly 42 is positioned directly above the landing zone 32, and lower the charge head assembly 42 (step 160). The bus 10 may be stationary or may be moving when the charge head assembly 42 descends. In embodiments where the bus 10 is moving when the charge head assembly descends, the charge head assembly 42 may start to descend before it is directly above the landing zone 32 so that it lands on the landing zone 32. As the bus 10 continues to move forward (step 170), the funnel-shaped alignment scoop 20 aligns and directs the charge head assembly 42 to engage with the charging blade 18 (step 180). When the charge head assembly 42 properly engages with the charge head assembly 42, a pilot signal is issued (step 190). The pilot signal indicates a good electrical connection between the charging blade 18 and the charge head assembly 42. Upon receipt of the pilot signal, the electrodes (e.g., retractable conductive brushes) in the charge head assembly 42 may extend to make electrical contact with the charging blade 18 and begin charging (step 200).

In some embodiments, as the bus 10 moves under the charge head assembly 42, an ultrasonic sensor 49 (or another sensor suitably positioned on the charging station 40 (e.g., on the charge head assembly 42) may map the roof profile of bus 10. The roof profile may confirm that the bus below is configured to be charged at the charging station 40 before the charge head assembly 42 descends on the roof 26 (i.e., step 160). In some embodiments, as illustrated in FIG. 3C, data from the multiple tags 24 (step 140) may additionally or alternatively be used to determine the alignment of the bus 10 with respect to the charging station 40 (step 142). For instance, data from tags 24 arranged along a length of the bus 10 may indicate if the bus 10 is aligned in the desired manner (e.g., substantially parallel to, and at a desired distance from, curb 56). If the bus 10 is not properly aligned, driving instructions may be sent to the driver of the bus 10 to align the bus in the desired manner (step 144). These instructions may be displayed on a display screen visible by the driver and may include instructions (steer left, etc.) to maneuver the bus 10 so that the bus 10 is aligned in the desired manner.

Although the tags 24 are described as being positioned on the roof 26 and the reader 48 is described as being positioned on the charging station 40, this is not a requirement. In some embodiments, one or more tags 24 may be positioned on the charging station 40 (e.g., the charge head assembly 42) and one or more readers 48 may be positioned on the bus 10 (e.g., with its antenna on or facing the roof 26) to determine the relative position of the charging interface 16 and the charge head assembly 42. Alternatively or additionally, in some embodiments, one or more tags 24 may be positioned on the road surface 52 proximate a charging station 40, and one or more readers 48 may be positioned on the bus 10 (e.g., with its antenna on floor 14). These tags 24 and readers 48 may be used to determine the alignment of the bus 10 with respect to the charging station 40 (or the charge head assembly 42) and/or the relative position of the charging interface 16 with respect to the charge head assembly 40 in a manner described above (FIGS. 3B and 3C).

Figure 4A:
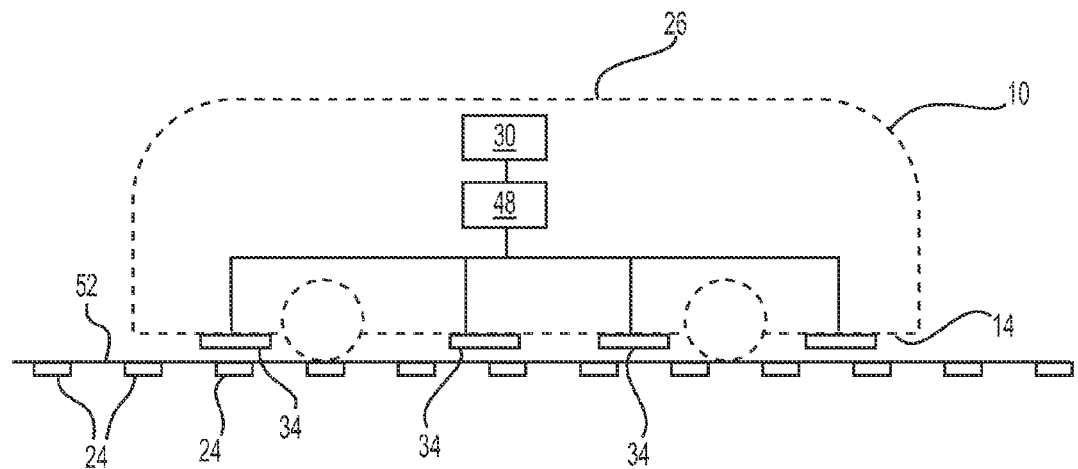
FIG. 4A is a schematic illustration of another exemplary embodiment of the bus and charging station of the current disclosure and FIG. 4B is schematic illustration of RFID tags embedded in a road surface of the exemplary charging station of FIG. 4A.
Figure 4B:
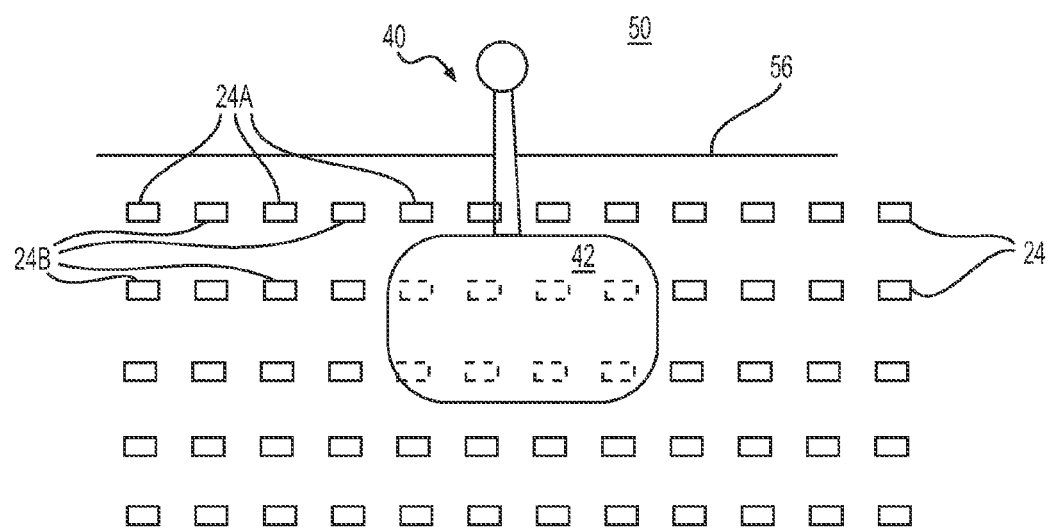

FIGS. 4A and 4B illustrate an embodiment in which multiple tags 24 are attached to (or embedded in) the road surface 52 in a grid-like pattern proximate a charging station 40, and a reader 48 is provided in the bus 10. Reader 48 may be coupled to a plurality of antennas 34 positioned under the floor 14 (or at another location) of the bus 10. The reader 48 may be coupled to a control unit 30 (e.g., docking controller) that controls the charging operations of bus 10. As the bus 10 drives over the tags 24, the reader 48 receives data from the tags 24 to determine the alignment of the bus and the relative position of the charging interface 16 with respect to the charge head assembly 42. When the control unit 30 determines that the charge head assembly 42 is positioned over the landing zone 32 (shown in FIG. 3A), it may instruct the charge head assembly 42 to descend. In some embodiments, the control unit 30 may also control the bus 10 (speed, steering, alignment, etc.), or send driver instructions, to align the bus as desired (e.g., parallel to curb 56) before lowering the charge head assembly 42.

In some embodiments, the tags 24 may include tags of different types (polarity generation, frequency, etc.). For example, the tags 24 may include horizontally polarized tags 24A and vertically polarized tags 24B. Horizontally and vertically polarized readers may be used to read these different tags. For example, a horizontally polarized tags 24A may be read using a horizontally polarized reader and a vertically polarized tag 24B may be read using a vertically polarized reader.

It should be noted that, although a plurality of antennas 34 are shown as being associated with a single reader 48, this is only exemplary. In some embodiments, only one antenna 34 may be associated with a reader 48. It is also contemplated that, in some embodiments, the tags 24 may be positioned on the bus 10 (e.g., on the floor 14) and the reader 48 may be positioned on the road surface 52. For example, an array of tags 24 may be embedded in a pattern on the floor 14, and one or more readers 48 may be positioned in the road surface 52. The readers 48 may be coupled to a control unit of the charging station 40. When a bus 10 drives over the readers 48 as it approaches the charging station 40, the readers 48 read the information stored in the tags 24 and determines the relative position of the charging interface 16 with respect to the charge head assembly 42. It should be noted that the tags 24 and readers 48 may be located at other locations also. For instance, in some embodiments, at least some of the tags 24 may be located on the side of a bus 10, at least one reader 48 may be located on post 46 or curb 56.

While the current disclosure describes using RFID sensors to align an electric bus 10 at a charging station 40, it should be understood that the disclosure is not limited thereto. Rather, the principles of the systems and methods described herein may be employed to align any vehicle to a feature. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description. For example, while certain features have been described in connection with various embodiments, it is to be understood that any feature described in conjunction with any embodiment disclosed herein may be used with any other embodiment disclosed herein.

We claim:

1. A method of charging an electric bus at a charging station, the electric bus including a charging interface on a roof of the bus, the charging interface being configured to connect with a charge head assembly of the charging station for charging, comprising:
    driving the bus towards the charging station;
    receiving data from a plurality of RFID tags as the bus is moving towards the charging station;
    using the received data to align the bus with respect to the charge head assembly;
    lowering the charge head assembly to land on the roof based on the received data;
    making contact between the charge head assembly and the charging interface; and
    charging the bus.

2. The method of claim 1, wherein the plurality of RFID tags are positioned on the roof, and the receiving data includes receiving the data using one or more RFID readers positioned on the charge head assembly.

3. The method of claim 1, wherein the plurality of RFID tags are positioned on the charge head assembly, and the receiving data includes receiving the data using one or more RFID readers positioned on the bus.

4. The method of claim 1, wherein the plurality of RFID tags are positioned on a road surface proximate the charging station, and the receiving data includes receiving the data using one or more RFID readers positioned on the bus.

5. The method of claim 1, wherein the plurality of RFID tags are positioned on a floor of the vehicle, and the receiving data includes receiving the data using one or more RFID readers positioned on a road surface proximate the charging station.

6. The method of claim 1, wherein using the received data to align the bus includes maneuvering the bus based on the received data to position a charge head landing zone on the roof below the charge head assembly of the charging station.

7. The method of claim 1, wherein the making contact includes moving the bus to slide the charge head assembly on the roof towards the charging interface to make contact of the charge head assembly with the charging interface.

8. The method of claim 7, wherein the making contact further includes using a funnel-shaved alignment scoop on the roof to direct the charge head assembly towards the charging interface as the charge head assembly slides on the roof.

9. The method of claim 1, wherein the plurality of RFID tags includes ten or more RFID tags.

10. The method of claim 1, wherein the received data includes positional information of each RFID tag of the plurality of RFID tags.

11. A method of charging an electric bus at a charging station, the charging station including a charge head assembly that overhangs a roof of the bus, the charge head assembly being configured to connect with a charging interface on the roof for charging, comprising:
    maneuvering the bus to position a charge head landing zone on the roof below the charge head assembly using data received from a plurality of RFID tags as the bus is moving towards the charging station;
    lowering the charge head assembly to land on the charge head landing zone;
    moving the bus forward to make contact between the charge head assembly and the charging interface; and
    charging the bus through the charge head assembly.

12. The method of claim 11, wherein the plurality of RFID tags are positioned on the roof, and the method further includes receiving data from the plurality of RFID tags using one or more RFID readers positioned on the charge head assembly when the bus is moving.

13. The method of claim 11, wherein the plurality of RFID tags are positioned on the charge head assembly, and the method further includes receiving data from the plurality of RFID tags using one or more RFID readers positioned on the bus when the bus is moving.

14. The method of claim 11, wherein the plurality of RFID tags are positioned on a road surface proximate the charging station, and the method further includes receiving data from the plurality of RFID tags using one or more RFID readers positioned on the bus when the bus is moving.

15. The method of claim 11, wherein the plurality of RFID tags are positioned on a floor of the bus, and the method further includes receiving data from the plurality of RFID tags using one or more RFID readers positioned on a road surface proximate the charging station when the bus is moving.

16. The method of claim 11, wherein the data received includes positional information of each RFID tag of the plurality of RFID tags.

17. A method of charging an electric bus at a charging station, the charging station including a charge head assembly configured to connect with a charging interface on a roof of the bus for charging, comprising:
   receiving data from a plurality of RFID tags as the bus is moving towards the charging station, the received data including information related to (a) the position of the plurality of RFID tags and (b) the position of the charging interface;
   maneuvering the bus using the received data to position a charge head landing zone on the roof below the charge head assembly;
   lowering the charge head assembly to land on the charge head landing zone;
   moving the bus forward to make contact between the charge head assembly and the charging interface; and
   charging the bus through the charge head assembly.

18. The method of claim 17, wherein the receiving data further includes receiving bus identification information.

19. The method of claim 17, wherein the receiving data includes receiving the data using one or more RFID readers positioned on the charge head assembly and the received data includes the location of plurality of RFID tags positioned on the roof of the bus.

20. The method of claim 17, wherein the receiving data includes receiving the data using one or more RFID readers positioned on the bus and the received data includes the location of the plurality of RFID tags positioned on the charge head assembly.

\* \* \* \* \*